United States Patent [19]

Wang

[11] Patent Number: 4,897,895

[45] Date of Patent: Feb. 6, 1990

[54] FRONT CASTER DEVICE FOR INFANT STROLLER

[75] Inventor: Kai-San Wang, Tainan Hsien, Taiwan

[73] Assignee: Sunshon Molding Co., Ltd., Tainan Hsien, Taiwan

[21] Appl. No.: 356,553

[22] Filed: May 25, 1989

[51] Int. Cl.⁴ ............................................. B60B 33/00
[52] U.S. Cl. ............................................. 16/20; 16/29
[58] Field of Search ................... 16/29, 20, 47, 48, 22, 16/31 R, 31 A

[56] References Cited

U.S. PATENT DOCUMENTS 4,107,817 8/1978 Sloan et al. ..................... 16/20

Primary Examiner—Nicholas Godici
Assistant Examiner—Carmine Cuda
Attorney, Agent, or Firm—Morton J. Rosenberg; David I. Klein

[57] ABSTRACT

A front caster device for facilitating directing an infant stroller which comprises a bracket for mounting an axle along a transverse axis for rotatably mounting a ground supporting wheel thereto having a socket having an inner flange and a bushing adapted to be rotatably fitted and engaged in the socket by means of at least a flexible detent extending outwardly and upwardly from periphery of the bushing which is attached to a distal end of a front leg of an infant stroller.

1 Claim, 4 Drawing Sheets

FRONT CASTER DEVICE FOR INFANT STROLLER

BACKGROUND OF THE INVENTION

This invention relates to a caster device, and particularly to an improved front caster device for an infant stroller which is easy to assemble.

Infant strollers and the like are known in the art. Mostly, a pair of casters are pivotally attached to the spaced front legs of an infant stroller to facilitate directing the infant stroller when strolling.

A prior front caster device of an infant stroller, as shown in FIGS. 1 and 2, which includes a ground supporting wheel 6 (front wheel) being pivotally attached to a front leg 2 by means of a bracket 1 and a bushing 14. An axle 61 is mounted to the bracket 1 along a fixed transverse axis. The front wheel 6 is mounted to the axle 61 for rotation about the fixed axis, as shown in FIG. 2.

The bracket 1 has a pair of axially spaced sockets 10, 11 and a ring member 13 of the same inner diameter as the sockets 10, 11 and having a pair of opposed holes 130, 131 can be rotatably fitted between the sockets 10, 11. The housing 14 having a top flange 142 and a pair of opposed holes 140, 141 can be rotatably fitted into the sockets 10, 11 and ring member 13 wherein the holes 140, 141 in the bushing 14 can be adjusted to correspond with holes 130, 131 in the ring member 13 by slightly rotating the bushing 14 relative to the ring member 13 as the flange 142 of the bushing 14 rests on top of the socket 10.

A straight distal end of the front leg 2 having a pair of opposed holes 20, 21 is fitted into the bushing 14 wherein the holes 20, 21 in the leg 2 can be adjusted to correspond with holes 140, 141 in the bushing 14 as well as the holes 130, 131 in the ring member 13 by slightly rotating the leg 2 relative to the bushing 14. The ring member 13, the bushing 14 and the front leg 2 are held fixably among one another by means of a conventional revet 15.

It is found disadvantegous that said front caster device is uneconomical in manufacture and labor consuming in assembly.

OBJECT OF THE INVENTION

It is accordingly a primary object of this invention to provide an improved front caster device for an infant stroller that overcomes the foregoing defects associated with prior art.

DETAILED DESCRIPTION OF THE PREFERRED EMBODIMENT

Figure 1:
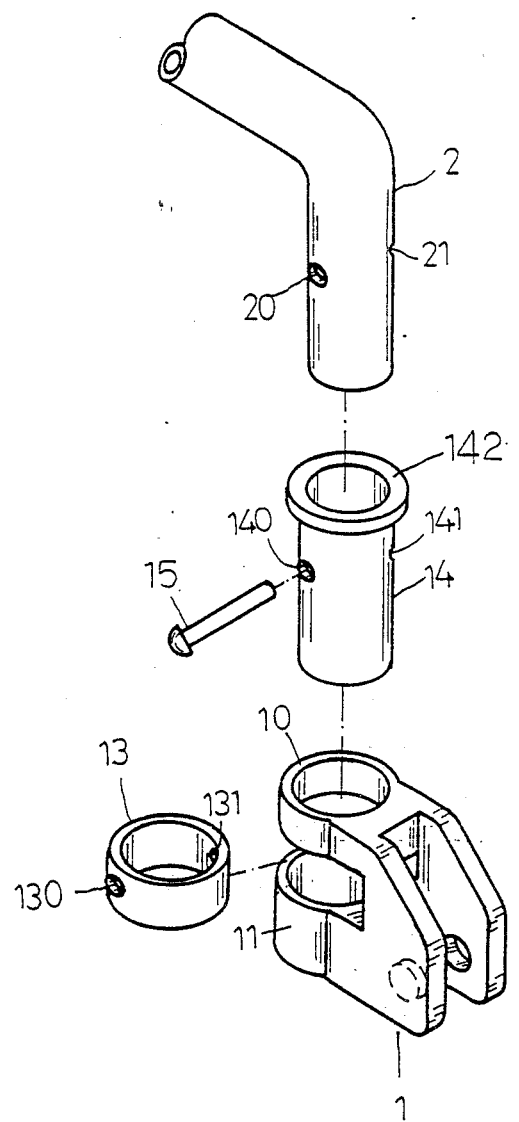
FIG. 1 is a perspective and exploded view of a known front caster device.
Figure 2:
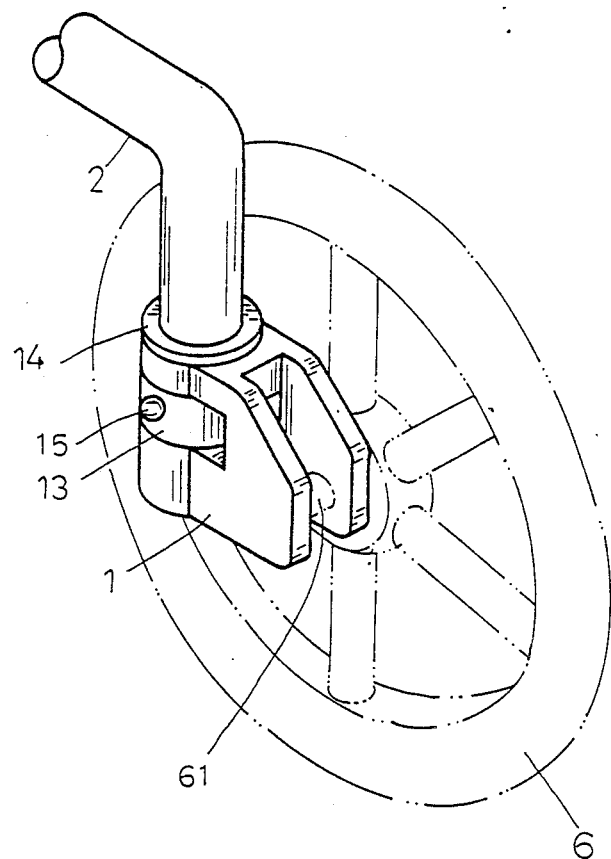
FIG. 2 is a perspective view of a known caster device shown in FIG. 1 which is in assembled condition.
Figure 3:
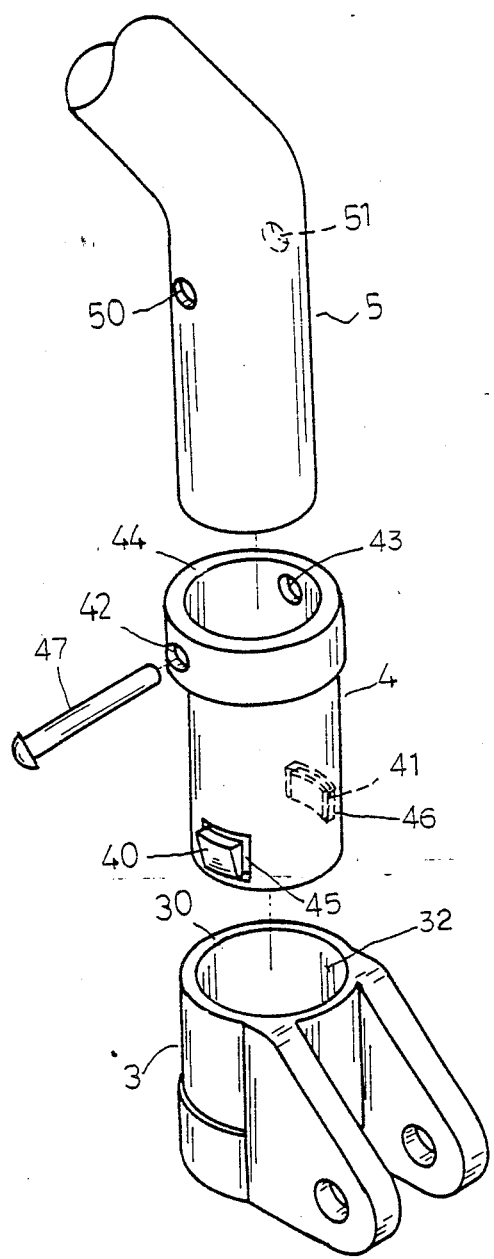
FIG. 3 is a perspective view and exploded view embodying a front caster device of the present invention.
Figure 4:
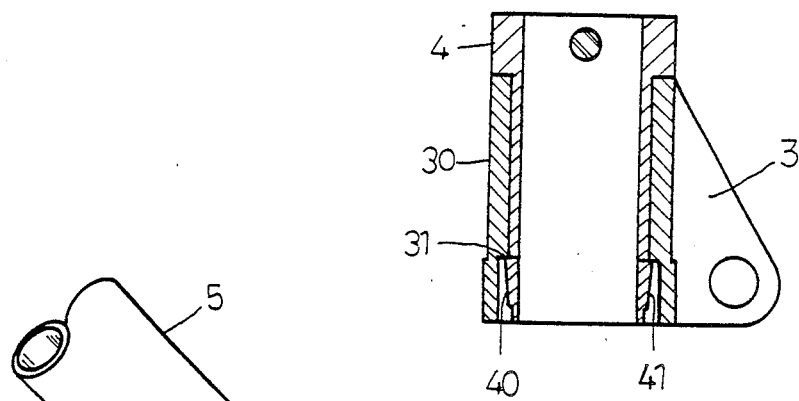
FIG. 4 is a cross-sectional view of the front caster device shown in FIG. 3 which is in assembled condition.
Figure 5:
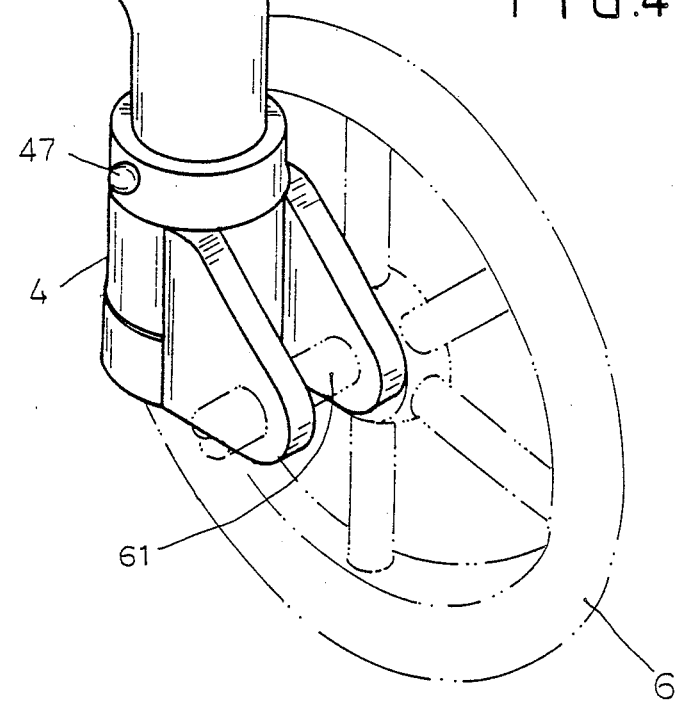
FIG. 5 is a perspective view of the front caster device shown in FIG. 3 which is in assembled condition.

Referring now to FIGS. 4 and 5, a preferred embodiment according to the present invention which comprises a bracket 3 having a tubular socket 30 and a tubular bushing 4 having a top flange 44 and adapted to be rotatably fitted into the socket 30 of the bracket 3.

The socket 30 has an inner flange 31 formed in an end away from an entrance 32 of inner periphery of its hollow space. An axle 61 is mounted to the bracket 3 along a fixed transverse axis and a front wheel 6 is mounted to the axle 61 for rotation about the fixed axis (as shown in FIG. 5). A pair of opposed holes 42, 43 is formed in the flange 44 and a pair of opposed flexible detents 40, 41 which extent upwardly and outwardly from the periphery of the bushing 4 are provided respectively in a pair of opposed openings 45, 46 formed in the bushing 4.

In assembly, a straight distal end of a front leg 5 having a pair of opposed holes 50, 51 is firstly fitted into the bushing 4 wherein the hole 50, 51 in the leg 5 can be adjusted to correspond with the holes 42, 43 in the flange 44 of the bushing 4 by slightly rotating the leg 2 relative to the bushing 4 and further held fixably to the bushing 4 by means of a conventional rivet 47. Then the bushing 4 is rotatably fitted into the socket 30 through the entrance 32 thereof and the flexible detents 40, 41 of the bushing are engaged with the inner flange 31 of the socket 30 of the bracket 3 as the top flange 44 rests on the socket 30.

The flexible detents 40, 41 are resiliently deformable in the inner periphery of the socket 30 and are positioned such that the top ends of the detents 40, 41 will contact the crest perimeter of the inner flange 31.

The present invention is obviously much easier to assemble and more economical to manufacture in comparison with known one.

What is claimed is:

1. A front caster device for an infant stoller comprising:
    a bracket for mounting an axle along an axis for rotatably mounting a ground supporting wheel thereto, having a tubular socket having an inner flange formed in an end away from an entrance of the socket on an inner periphery thereof said axle axis being transverse to a longitudinal axis of said tubular socket;
    a bushing adapted to be rotatably fitted in said socket through the entrance thereof, having a flange provided with a pair of opposed holes adapted to correspond with a pair of opposed holes in a distal end of a front leg of an infant stroller and at least a flexible detent extending upwardly and outwardly from an outer periphery thereof, axially spaced from the flange and adapted to be engaged with the inner flange of the socket; and
    a rivet for attaching the bushing to the distal end of the leg by insertion through said holes.

* * * * *